(12) United States Patent
Wood

(10) Patent No.: US 8,746,615 B2
(45) Date of Patent: Jun. 10, 2014

(54) LANDING GEAR

(75) Inventor: Christopher Neil Wood, Cheshire (GB)

(73) Assignee: Airbus Operations Limited, Bristol (GB)

( * ) Notice: Subject to any disclaimer, the term of this patent is extended or adjusted under 35 U.S.C. 154(b) by 603 days.

(21) Appl. No.: 12/200,596

(22) Filed: Aug. 28, 2008

(65) Prior Publication Data

US 2009/0084894 A1    Apr. 2, 2009

Related U.S. Application Data

(63) Continuation of application No. 10/551,939, filed on Oct. 5, 2006, now abandoned.

(30) Foreign Application Priority Data

Apr. 7, 2003 (GB) .................................. 0308003.3

(51) Int. Cl.
*B64C 25/10* (2006.01)

(52) U.S. Cl.
USPC ...................................... 244/102 R; 244/1 N

(58) Field of Classification Search
USPC .............................. 244/1 N, 102 R
See application file for complete search history.

(56) References Cited

U.S. PATENT DOCUMENTS

| | | | |
|---|---|---|---|
| 1,968,005 A | 7/1934 | Swain | |
| 1,969,088 A | 8/1934 | Maranville | |
| 2,012,449 A | 8/1935 | Hamilton | |
| 2,055,248 A | 9/1936 | Cautley | |
| 2,176,461 A * | 10/1939 | Larsen | 244/102 R |
| 2,180,462 A | 11/1939 | De Seversky | |
| 2,296,671 A | 9/1942 | Hollerith | |
| 2,346,010 A | 4/1944 | Cowey | |
| 2,487,548 A | 11/1949 | Hawkins, Jr. | |
| 2,747,817 A * | 5/1956 | Saulnier | 244/50 |
| 2,811,326 A | 10/1957 | Westcott, Jr. | |
| 2,842,325 A | 7/1958 | Green et al. | |
| 2,863,623 A | 12/1958 | Lebold | |
| 2,941,756 A | 6/1960 | Roberts | |
| 2,943,827 A | 7/1960 | Hartel et al. | |
| 3,062,485 A | 11/1962 | Hartel | |

(Continued)

FOREIGN PATENT DOCUMENTS

| | | |
|---|---|---|
| DE | 43 01 778 A1 | 7/1994 |
| EP | 0 119 149 A2 | 9/1984 |

(Continued)

OTHER PUBLICATIONS

Extended EP Search Report for Application No. EP 10 170 885.7 Dated Nov. 2, 2010 (7 pgs.).

(Continued)

*Primary Examiner* — Timothy D Collins
*Assistant Examiner* — Brian M O'Hara
(74) *Attorney, Agent, or Firm* — Patterson Thuente Pedersen, P.A.

(57) ABSTRACT

An aircraft landing gear is arranged such that in its deployed position it is configured to reduce, during the approach on landing, the noise generated by the interaction of the landing gear and the air flowing past the landing gear. Various means are described to reduce the amount of turbulent air flow generated in the region of the landing gear, including inverting and fairing the nose-gear shock-absorbing leg, providing faired twin in-line oleos and providing fairings that produce shielding air curtains.

11 Claims, 4 Drawing Sheets

(56) References Cited

U.S. PATENT DOCUMENTS

| | | | |
|---|---|---|---|
| 3,292,919 | A | 12/1966 | Lindley et al. |
| 3,567,159 | A | 3/1971 | Klein |
| 3,934,923 | A | 1/1976 | Lissaman et al. |
| 3,954,232 | A * | 5/1976 | Harper ............ 244/102 R |
| 4,434,830 | A | 3/1984 | Landers et al. |
| 4,491,288 | A | 1/1985 | Sinclair |
| 4,537,373 | A | 8/1985 | Butts |
| 4,681,284 | A | 7/1987 | Veaux et al. |
| 4,834,320 | A | 5/1989 | Tyson |
| 5,337,976 | A | 8/1994 | Derrien |
| 5,490,644 | A | 2/1996 | Koncsek et al. |
| 6,048,477 | A | 4/2000 | Thorpe et al. |
| 6,173,920 | B1 | 1/2001 | Meneghetti |
| 6,308,916 | B1 | 10/2001 | Hrusch |
| 6,786,451 | B2 | 9/2004 | Courtois et al. |
| 7,520,792 | B2 * | 4/2009 | Yen ............................ 446/55 |
| 2006/0032981 | A1 | 2/2006 | Fort |
| 2011/0001004 | A1 | 1/2011 | Wood |

FOREIGN PATENT DOCUMENTS

| | | |
|---|---|---|
| EP | 0 614 804 A1 | 9/1994 |
| EP | 0 865 986 A3 | 9/1998 |
| EP | 1 067 045 A1 | 1/2001 |
| EP | 1 340 676 A1 | 9/2003 |
| EP | 1382526 | 1/2004 |
| FR | 1323294 | 4/1963 |
| FR | 2 739 351 A1 | 4/1997 |
| GB | 286313 | 11/1928 |
| GB | 335611 | 9/1930 |
| GB | 395150 | 7/1933 |
| GB | 438968 | 11/1935 |
| GB | 568331 | 3/1945 |
| GB | 579657 | 8/1946 |
| GB | 583963 | 1/1947 |
| GB | 602795 | 6/1948 |
| GB | 603804 | 6/1948 |
| GB | 608883 | 9/1948 |
| GB | 932731 | 7/1963 |
| GB | 958427 | 5/1964 |
| GB | 963333 | 7/1964 |
| GB | 1 423 895 | 2/1976 |
| GB | 1 515 239 | 6/1978 |
| GB | 2 094 242 A | 9/1982 |
| JP | 2001-347997 | 12/2001 |
| WO | WO 01/04003 A1 | 1/2001 |

OTHER PUBLICATIONS

Notice of Allowance from related U.S. Appl. No. 12/855,755, dated Dec. 27, 2013, 10 pgs.

* cited by examiner ated early for
LANDING GEAR

RELATED APPLICATIONS

This application is a continuation of application Ser. No. 10/551,939 filed Oct. 5, 2006, which in turn claims priority to Application No. PCT/GB2004/001525 filed Apr. 7, 2004, which in turn claims priority to Application No. GB 0308003.3 filed Apr. 7, 2003, and also related is Application No. EP 03252216.1 filed Apr. 8, 2003, all of which are hereby fully incorporated herein by reference.

BACKGROUND OF THE INVENTION

The present invention relates to reducing aircraft noise. In particular, the invention relates to landing gear designed to reduce the noise generated by the interaction of the landing gear and the air flowing past it during flight, especially during the approach of the aircraft on landing.

It is desirous to reduce the noise generated by aircraft, for example, to lessen disruption or inconvenience, resulting from aircraft noise, caused to the public on the ground near airports. A significant amount of noise is generated by the interaction of the aircraft and the air flowing past it, which results in turbulent flows and consequently noise. It is particularly important to reduce noise created during approach of the aircraft on landing. During approach, a significant contribution to the amount of noise that the aircraft makes is made by the landing gear, which is typically deployed early for landing for safety reasons. The deployment of the landing gear increases drag and assists deceleration of the aircraft. During take-off, noise from the landing gear is a less significant factor because engine noise is generally greater and because the landing gear is generally stowed at the earliest opportunity to reduce drag and aid take-off. During normal flight, the landing gear of an aircraft is typically stowed in a landing gear bay, the bay being closed off by doors so that no part of the landing gear is subjected to the air flow.

It is an aim of the present invention to provide a landing gear that generates less noise compared to a landing gear of the same size that has not been adapted, designed or manufactured in accordance with the present invention.

SUMMARY OF THE INVENTION

According to the present invention there are provided various arrangements of aircraft each being so arranged that during approach of the aircraft on landing (with the landing gear exposed to the airflow) the noise generated by the interaction of the landing gear and the air flowing past the landing gear is reduced. Thus in each case the landing gear is advantageously arranged or configured so that the noise generated during landing of the aircraft by means of the landing gear interacting with air flowing past the landing gear is reduced compared with an arrangement of the landing gear not having the features according to the invention, but otherwise being identical. The landing gear or a part thereof may for example be designed to reduce, in use, the amount of turbulent air flow generated in the region of the landing gear. Alternatively, or additionally, the landing gear or a part thereof may be designed to streamline, in use, the flow of air past the landing gear. The landing gear may for example include at least one noise-reducing element. The noise-reducing element may of course perform another function. The noise-reducing element may for example be in the form of one or more separate fairings. The noise-reducing element may be in the form of a conventional component of the aircraft landing gear that has been shaped or positioned in such a way as to reduce noise.

According to a first aspect of the present invention there is provided an aircraft landing gear including a plurality of longitudinal load bearing supports, the supports being arranged in parallel and such that, in use when the landing gear is in an operative position, they are arranged one behind the other in the direction of the air flow. The invention, in accordance with this first aspect, also provides an aircraft including landing gear, preferably movable between a deployed position and a stowed position, wherein the landing gear includes a plurality of longitudinal load bearing supports and a noise reduction fairing, the landing gear being so arranged that, in use when the landing gear is in its deployed position, the supports are arranged in parallel one behind the other in the direction of the air flow and the noise reduction fairing at least partially fairs the front load bearing support. The noise reduction fairing advantageously diverts air flow away from noise-generating elements of the landing gear in the region of the load bearing supports. Thus, the load bearing supports may be shielded from the full effects of the air-flow and thus noise that would otherwise be generated by the interaction of the landing gear and the air flowing past the landing gear may be reduced.

The plurality of longitudinal load bearing supports are preferably so arranged that when the landing gear is in the operative position each load bearing support is so arranged that the long axis of the support is substantially perpendicular to the longitudinal axis of the aircraft. At least one of the load bearing supports may include a shock absorbing element. The or each shock absorbing element may include a piston and barrel arrangement. In the case where at least two of the load bearing supports include shock absorbing elements, one of the shock absorbing elements may advantageously be configured to have a different shock absorbing capacity from at least one of the other shock absorbing elements. The load bearing supports are conveniently arranged to support loads when the aircraft is on the ground via wheels mounted on a wheel mounting means such as for example a bogie. Preferably, two of the load bearing supports are arranged to be able to vary the pitch of a bogie, on which the wheels are mounted. Such an arrangement makes it possible for the bogie not to be provided with a separate pitch trimmer. Two of the load bearing supports may be configured to withstand significantly different loads. One of the load bearing supports may for example have a greater cross-sectional area or may be made from a different material. One load bearing support being configured to withstand a different load from another of the load bearing supports may be of particular advantage in the case where the supports are arranged to perform a pitch trimming function.

The landing gear may advantageously be arranged such that one or more service pipes, cables, conduits, or the like, are provided between at least two of the longitudinal load bearing supports. By having such an arrangement, the service pipes, cables, conduits, or the like, may be shielded from the air flow. Noise that might otherwise be generated by the service pipes, cables, conduits, or the like, may therefore be reduced. Preferably two or more, and more preferably more than three, service pipes or conduits may be provided between at least two of the longitudinal load bearing supports. The service pipes, cables, conduits or the like may include one or more of the group consisting of pipes for hydraulic fluid, cables for conducting power and/or electronic signals, or other pipes, cables or the like for providing services to parts of the landing gear.

The front load bearing support is preferably at least partly faired by a fairing element when the landing gear is in its operative position. The fairing element preferably extends around at least two of the load bearing supports. The fairing element preferably encompasses, but not necessarily encases, at least two of the load bearing supports. The fairing may be substantially oval in cross-section. The cross-section may, and preferably does, vary along its length.

One or more fairings may be provided which is/are configured and arranged as to cause air flow diversion that reduces unwanted noise, especially during approach on landing. The one or more fairings could be arranged not only to divert air away from parts of the landing gear that generate unwanted noise, but also to alter the aerodynamics of the landing gear so as to indirectly divert air away from such parts.

According to a second aspect of the present invention there is thus provided an aircraft including a noise reduction fairing, the fairing including an air-intake that is fed via an air-duct to an air exhaust, the fairing being so shaped that, in use during approach on landing, the air flowing through the air-duct produces a noise-reducing air flow that diverts air away from parts of the aircraft that generate unwanted noise. The noise-reducing airflow may, at least in part, flow out of the air-exhaust and/or flow into a second air in-take. In the case where the noise-reducing airflow flows into a second air in-take, pressure differences resulting from the flow of air from the first air-intake of the fairing to the air-exhaust may conveniently draw air into the second in-take, the flow of air into the second in-take forming at least in part the noise-reducing airflow.

The fairing may be so arranged that the noise-reducing air flow is in the form of at least a part of an air-curtain. Preferably, the air curtain so formed assists in diverting air away from parts of the landing gear that generate unwanted noise. The fairing may thus assist in reducing unwanted noise on landing by means of the air curtain forming a notional extension of the fairing surface.

It will of course be appreciated that the air curtain may not be stable in form and will have a form that varies and is possibly rather complicated in shape. The air curtain would almost certainly not for example be planar in shape. The air curtain may be formed in such a way that a quiet region is formed between the landing gear and the air curtain. The quiet region insofar as this aspect of the invention is concerned may be defined as a region in which the average air velocity is significantly less than the average air velocity in a region on the other side of and adjacent to the air curtain. The quiet region may alternatively be defined as a region in which the average air velocity is significantly less than the average air velocity that would have existed had the air curtain not been present. The quiet region may alternatively be defined as a region in which the noise generated is significantly less than the noise that would have been generated had the air curtain not been present.

The air-intake is preferably in the form of a ram-intake. The ram-intake may for example be in the form of an opening that is linked directly adjacently to an intake-passageway that is generally aligned with the direction of the airflow incident on the opening. The air-intake preferably covers an area, which would, if the air-intake were replaced with an extension of the surrounding fairing, cover at least one stagnation point or cover at least the majority of a stagnation line. The term stagnation point is well known in the art. By way of example, the term may simply be defined as the point on a surface, for example a fairing, at which it may be considered the air impacting against the fairing divides. Alternatively, as a very simple approximation, the stagnation point on a surface that is travelling in a given direction may be considered as being the point at which the normal to the surface is parallel to the direction of travel. Thus a given surface may have several stagnation points or the surface may have an infinite number of stagnation points, forming a stagnation line or even a stagnation area. Also, the position of the or each stagnation point will vary with the direction of relative motion between the surface and the fluid through which it moves.

The air duct may include a passageway that is narrower in cross-section than the rest of the air-duct. For example, the passageway may form a venturi tube. Having such a narrowing, or constriction, may increase the velocity of air flowing through the passageway. Preferably, the speed of the noise-reducing airflow is greater than the speed of the airflow entering the air-intake (or if there are two or more air-intakes, the speed of the airflow entering the air-intake having the lowest air inflow speed). Preferably, the noise-reducing airflow has an average speed of over 120%, more preferably over 150% and even more preferably over 200%, that of the speed of the free-stream airflow relative to the aircraft.

The air exhaust may comprise a plurality of outlets. The plurality of outlets may be arranged in series to form an air-flow having a generally elongate cross-sectional profile immediately downstream of the exhaust. The exhaust may comprise a single outlet, having a generally elongate cross-section.

The noise reduction fairing is advantageously mounted on the landing gear. The noise reduction fairing is advantageously mounted such that the noise-reducing air flow diverts air away from parts of the landing gear that generate unwanted noise. Alternatively or additionally, the landing gear may include a fairing that is so configured and arranged as to cause some of the air flowing in the region of the landing gear to form an air curtain and a quiet region between the landing gear and the air curtain. The landing gear is preferably movable between a deployed position and a stowed position.

According to a third aspect of the present invention there is provided an aircraft including a landing gear, preferably movable between a deployed position and a stowed position, including a load bearing support, the support being connected between the upper end of the landing gear and a wheel assembly at the lower end of the landing gear, the support including a piston and barrel arrangement, the piston being positioned closer to the lower end of the landing gear than the barrel, wherein the landing gear includes a noise reduction fairing that fairs the barrel. There is also provided an aircraft landing gear including a load bearing support, the support including a first end which is attached, or is attachable, to a wheel assembly and a second end, which is opposite to the first end, and which is attached, or is attachable, to an aircraft, wherein the first and second ends are connected via a piston and barrel arrangement comprising a piston connected to the second end and a barrel connected to the first end, the barrel advantageously being arranged and configured to have a streamlined shape, for example, by being faired. The piston and barrel arrangement may be in the form of a shock absorber arrangement as is known in the art.

It is common practice to have a landing gear with the piston and barrel arrangement arranged such that the piston is connected to the lower end of the landing gear (the "first end") and the barrel is connected to the upper end of the landing gear (the "second end"). Such an arrangement has become common practice in the art, possibly for reasons associated with minimising the total weight of the arrangement. However, we have overcome this technical prejudice in the art and propose effectively to invert the piston/barrel arrangement of the landing gear. This inversion of the piston/barrel arrangement makes several features possible that may have benefits in terms of noise reduction as is explained in further detail below.

The barrel may be in the form of a conventional cylinder that accommodates a piston. The barrel conveniently comprises a cylindrical bore having a circular cross-section that accommodates the piston, which is shaped to fit inside the cylindrical bore. The barrel is advantageously being arranged and configured to have a streamlined shape. The noise-reduction fairing is preferably arranged to provide the barrel with a streamlined shape. For example, the barrel may additionally or alternatively be oval, or tear-drop-shaped, in cross-sectional shape. The piston may also be streamlined in cross-sectional shape, but is advantageously circular in cross-section.

The inversion of the piston and barrel arrangement may also facilitate the positioning of noise-generating parts or components of the landing gear out of the air-flow and into the interior of the aircraft. Examples of such components that could be so positioned inside the aircraft include the steering actuators and the torque links. It will be understood that positioning such components so that they are only partly within the interior space of the aircraft will provide some benefit in terms of noise reduction and it will therefore be understood that such components need not be wholly contained within the interior of the aircraft. It is however preferred for the majority of each such component to be within the aircraft. Preferably, 75% of the or each component is accommodated inside the aircraft, and more preferably, substantially all of the component is accommodated inside the aircraft.

Advantageously, the piston and barrel arrangement is so configured that, when connected to the aircraft with the landing gear in an operative position and the piston and barrel are extended to the normal operating maximum extension, the majority of the piston is accommodated inside the aircraft, for example inside the landing gear bay of the aircraft. Preferably, 75% of the exposed part of the piston is accommodated inside the aircraft, and more preferably, substantially all of the exposed part of the piston is accommodated inside the aircraft, for example inside the aircraft gear storage cavity (the landing gear bay).

The landing gear may include one or more torque links. Such torque links may for example be provided for transmitting loads sustained during landing of the aircraft, including for example vertical and/or horizontal loads caused by steering of the aircraft and/or as a result of the weight of the aircraft. In that case the piston and barrel arrangement is advantageously so configured that, when the landing gear is in its deployed position and the piston and barrel are extended to the normal operating maximum extension, the one or more torque links are accommodated inside the landing gear bay of the aircraft. Preferably, the piston and barrel arrangement is so configured that, when the landing gear is in its deployed position and the piston and barrel are extended to the normal operating maximum extension, all torque links associated with the landing gear that would, if the piston were positioned closer to the lower end of the landing gear than the barrel, contribute to the noise generated by the interaction of the mechanisms and the airflow, are accommodated inside the landing gear bay of the aircraft.

The landing gear may include steering mechanisms for steering the wheel assembly, and the piston and barrel arrangement is so configured that, when the landing gear is in its deployed position and the piston and barrel are extended to the normal operating maximum extension, the steering mechanisms are accommodated inside the landing gear bay of the aircraft.

Preferably, the piston and barrel arrangement is so configured that, when the landing gear is in its deployed position and the piston and barrel are extended to the normal operating maximum extension, all steering mechanisms associated with the landing gear that would, if the piston were positioned closer to the lower end of the landing gear than the barrel, contribute to the noise generated by the interaction of the mechanisms and the airflow, are accommodated inside the landing gear bay of the aircraft.

The landing gear mentioned above in relation to any aspect of the invention may be one of the main landing gear of the aircraft. The landing gear mentioned above in relation to any aspect of the invention may be the or one of the nose landing gear of the aircraft. The landing gear may be in the form of a central landing gear, for example generally in line with central longitudinal axis of the aircraft. The landing gear may be in the form of a wing gear. Some aspects of the above-mentioned invention are especially relevant or well suited to particular types of landing gear. For example, the inversion of the landing gear according to the third aspect of the invention is particularly well suited to a nose landing gear. Conventionally the nose landing gear of an aircraft is not provided with a bogie on which the wheel(s) are mounted. Thus, in relation to the aspects of the present invention that are concerned with or relate in some way to a bogie, it is preferred that the landing gear is in the form of a landing gear large enough to warrant the provision of a bogie (for example a main landing gear).

Aircraft having landing gear that are fixed in position are generally not designed with noise reduction in mind. The invention is of greater application to larger aircraft, particularly passenger-carrying aircraft, where noise reduction on landing of the aircraft is of greater relevance. The landing gear is preferably of a size suitable for use on an aircraft designed to carry more than 50 passengers, and more preferably more than 100 passengers. Such aircraft generally have retractable landing gear assemblies.

Above the term "load bearing support" is used herein with reference to different aspects of the invention. The or each load bearing support may be in the form of a column which transfers at least the majority of the load between the wheels to which the landing gear is in use attached and the body of the aircraft when the aircraft weight is supported by the wheels. The or each load bearing support may be in the form of a column that is so positioned as to connect one or more wheels to the aircraft.

Reference is made herein to the landing gear being in an operative position. It is intended that the operative position of the landing gear covers the case where the landing gear is in a position ready for landing. It may of course be the case that the landing gear is not movable from its operative position. The present invention is of particular application, however, where the landing gear is movable from an operative position (when the landing gear is deployed) to a stored position. For example, in its stored position the landing gear may be wholly contained within the interior of the aircraft, for example within a landing gear bay.

The aircraft landing gear of the aircraft of the present invention may of course be manufactured separately from the aircraft and the wheels that in use would be connected to the landing gear. Thus the invention further provides a landing gear suitable for use as the landing gear of the aircraft described herein with reference to any of the aspects of the invention. The landing gear may for example not be provided with the rest of the aircraft or any wheels.

According to the present invention there is also provided means for converting a conventional landing gear into a landing gear according to any aspects of the invention as described herein, wherein the means includes at least one noise reducing element. The means may for example be one or more fairing elements or one or more components that are streamlined in shape. The noise reducing element may be in the form of a noise reduction fairing as described herein.

The present invention also provides a method of reducing noise caused by landing gear on an aircraft including a step of manufacturing a landing gear according to any aspects of the invention as described herein. The method may for example include a step of modifying an existing design in order to reduce noise caused by the landing gear.

There is yet further provided a method of flying an aircraft during the approach on landing of the aircraft, the method including a step of using one or more components of the aircraft landing gear to reduce the noise generated by the interaction of the landing gear and the air flowing past the landing gear, wherein the landing gear is in accordance with any of the aspects of the invention mentioned herein. The one or more components of the aircraft landing gear may for example be in the form of a noise reduction fairing as described herein.

BRIEF DESCRIPTION OF THE DRAWINGS

Embodiments of the present invention will now be described by way of example with reference to the accompanying schematic drawings of which:

FIG. 1b is a diagrammatic cross-section of the main landing gear shown in FIG. 2a;

FIG. 2b is a schematic diagram illustrating the function of a part of the undertray shown in FIG. 2a;

FIG. 3b is a diagrammatic cross-section section of the nose gear shown in FIG. 3a.

DETAILED DESCRIPTION OF THE DRAWINGS

The embodiments of the invention as described herein all relate to an aircraft landing gear movable between a stored position and a deployed position, the landing gear being suitable for use on an aircraft designed to carry more than 100 passengers and being so arranged that in its deployed position it is configured to reduce the noise generated by the interaction of the landing gear and the air flowing past the landing gear. The same reference numbers are therefore used in relation to features common to all of the embodiments.

Figure 1A:
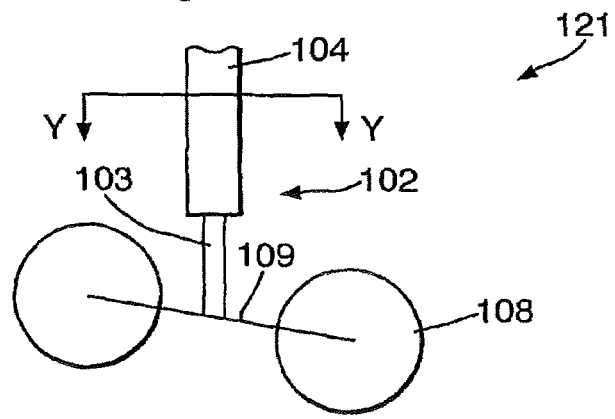
FIG. 1a is a diagrammatic side view illustration of a prior art main landing gear.
Figure 1B:
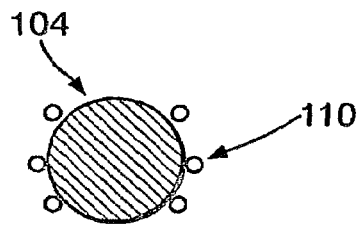
Figure 1C:
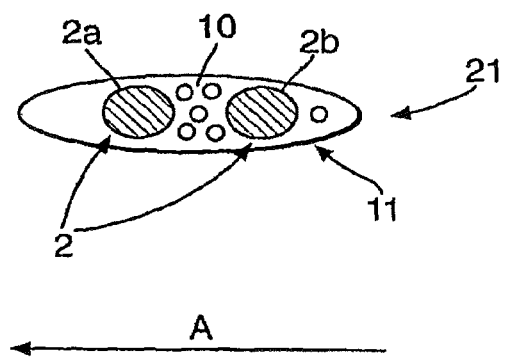
FIG. 1c is a diagrammatic cross-section of a main landing gear according to a first embodiment of the invention.

FIG. 1a shows a main landing gear 121 according to a prior art construction. The gear includes a leg 102 comprising an oleo cylinder 104 that accommodates an oleo strut 103 positioned beneath. The strut 103 is coupled to the wheels 108 via a bogie 109. FIG. 1b is a cross-section taken along the line Y-Y and shows the oleo cylinder 104 surrounded by various service pipes/conduits/cables 110. FIG. 1c is a cross-section of a main landing gear 21 according to a first embodiment of the invention, the cross-section being at an equivalent location to the line Y-Y to illustrate the differences between the prior art construction shown in FIGS. 1a and 1b and the first embodiment. There are two legs 2a, 2b, the legs being parallel to each other, spaced apart and aligned in the direction of travel, which is indicated by the arrow A. All service pipes/conduits/cables 10 and other such services are provided between the two legs 2. The legs 2 and the services 10 are surrounded by a fairing 11, that is oval in shape, the long axis of the oval being aligned with the direction of travel of the aircraft. The area presented to the airflow as viewed in the direction of travel of the leg 2 is therefore less compared to the area presented by the leg 102 of the prior art construction. Also, noise generated by the services 110 previously positioned around the leg 102 is reduced by moving the services 10 out of the air flow. The two legs 2a, 2b each include a shock absorber in the form of an oleo strut and cylinder assembly. The shock absorber of the front leg 2a has different shock absorbing properties from the rear leg 2b. The ability of the legs 2 to have different shock absorbing properties reduces the structural need for torque links and trimming of the wheels. Thus, the noise that would otherwise be generated by the components required for reacting torques and for providing the trimming capability may be reduced.

Figure 2A:
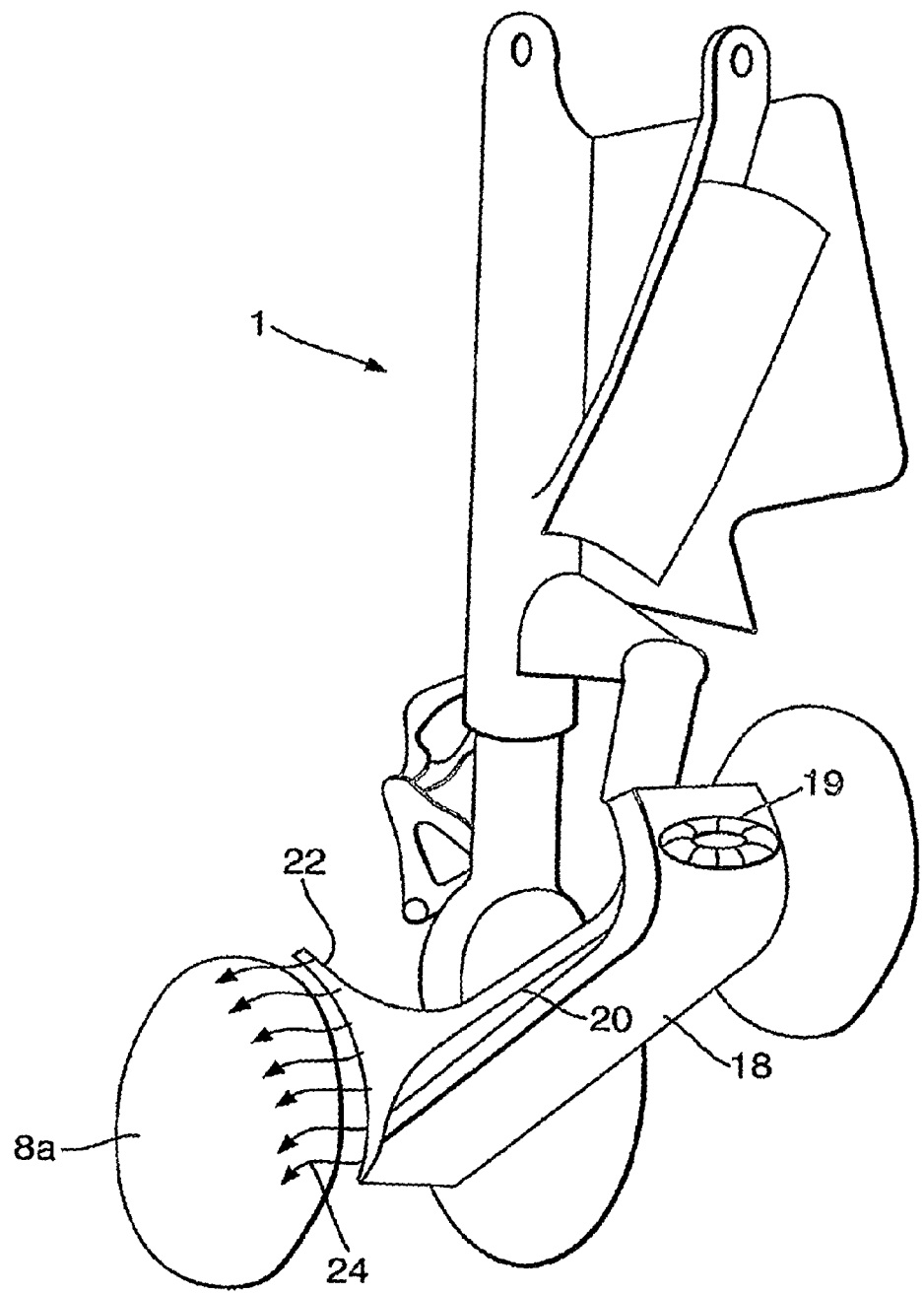
FIG. 2a is a diagrammatic perspective view of a main landing gear with an undertray fitted in accordance with a second embodiment of the invention.
Figure 2B:
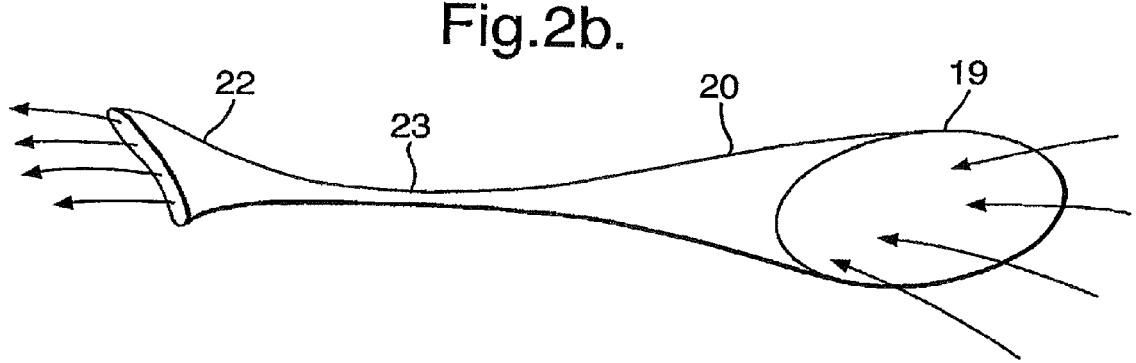

According to a second embodiment, shown in FIGS. 2a and 2b there is provided an aircraft main landing gear 1 with an undertray 18 fitted. The undertray 18 includes a fairing 11 that has a central air intake vent 19, that is connected via an air duct 20 to an air exhaust 22. The air intake vent 19 is positioned at the stagnation point on the leading edge of the undertray 18 and is in the form of a ram air intake. The air intake 19, air duct 20, and air exhaust 22 of the fairing are illustrated schematically in FIG. 2b. As can be seen in FIG. 2b, the air duct 20 includes a narrowed region 23 that acts as a venturi tube. During flight, air enters the intake 19 and is directed down the duct 20. The airflow speeds up as it flows through the venturi tube 23 and the air then exits with high speed from the exhaust 22. The exhaust 22 is shaped as a diffuser that causes the air to exit in the form of an air curtain 24 (see FIG. 2a), which acts as a virtual (air) fairing. The air exhaust 22 is shaped and configured such that the air curtain 24 forms a shape that diverts air away from the adjacent wheel 8a. Thus, the high speed air curtain 24 that is exhausted from the diffuser 22 takes precedence over the lower speed air passing the wheel 8a, the high speed air maintaining its (virtual) fairing shape, thus shielding the wheel 8a and reducing noise that would otherwise arise from the interaction of the lower speed air and the wheel 8a. The outlet of the air exhaust 22 is in the form of a relatively elongate slot and has an area that is significantly less than the area of the opening at the ram air intake 19.

Figure 2C:
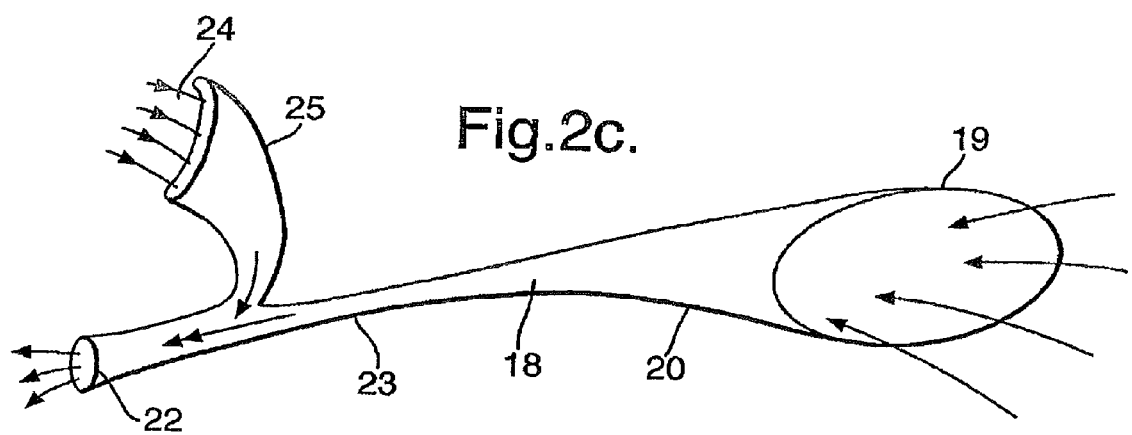
FIG. 2c is a schematic diagram showing the functioning of a third embodiment of the invention.

A third embodiment of the invention is illustrated schematically by FIG. 2c. The third embodiment operates in a manner very similar to that of the second embodiment, in that an air curtain 24 is formed by means of a fairing 18 having a ram air intake 19 and an air exhaust 22. However, the third embodiment differs from the second, in that the air curtain 24 is not formed by the air exhausted from the air exhaust 22; instead (as can be seen in FIG. 2c) an extra intake opening is provided in the form of a diffuser intake 25, which forms the air curtain 24. The operation of the fairing 18 of the third embodiment may be understood as follows. Air enters the ram air intake 19, passes along the duct 20 and increases in speed as it flows through the venturi tube 23 and then passes out of the exhaust 22 with very high speed. The air pressure just beyond the venturi tube 23 is, as a result of the high speed airflow, lower than the exterior of the fairing 18 and thus, air is drawn through the diffuser intake 25. (In other words, the air is sucked through the diffuser intake 25 by air being drawn down the fairing intake 25 to join the high speed air created by the air flowing from the ram air intake 19 through the venturi 23 and out of the exhaust 22). The shape of the diffuser intake 25 is similar to the diffuser air exhaust 22 described with reference to the second embodiment in that it is in the form of a generally elongate slot. Thus, the air that is drawn into the diffuser intake 25 forms an air curtain 24 that is used to divert slower airflow away from noise generating parts of the landing gear.

Figure 3A:
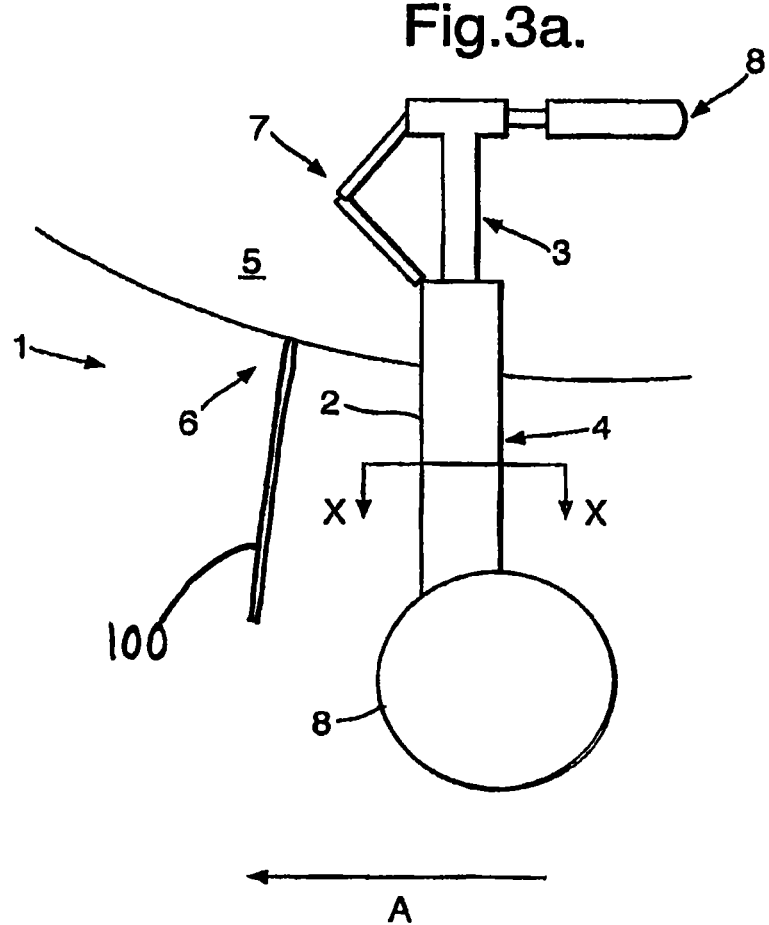
FIG. 3a is a diagrammatic side view illustration of an inverted nose gear according to a fourth embodiment of the invention.
Figure 3B:

FIG. 3a is a schematic diagram illustrating the principles of operation and design of a nose landing gear 1 according to a fourth embodiment of the invention. The gear 1 is shown in its deployed position and includes a central leg 2 comprising an oleo strut 3 and an oleo cylinder 4, which receives the oleo strut 3. During normal flight, the landing gear 1 of an aircraft is typically stowed in a landing gear bay 5, the bay 5 being closed off by doors 100 so that no part of the landing gear 1 is subjected to the airflow. The oleo strut and cylinder form a pneumatic shock absorber in a manner known in the art. The entire oleo strut 3 is housed within the landing gear bay 5, within the fuselage 6. The embodiment differs from prior art constructions in that the oleo strut and cylinder have been inverted, in that the aircraft body is coupled to the wheels via the strut 3 and then the cylinder 4. A cross-section taken along the line X-X is shown in FIG. 3b, which shows the oval cross-sectional shape of the oleo cylinder 4. The long axis of the oval is aligned with the direction of travel of the aircraft, which is indicated by the arrow A in FIG. 3a. The oleo cylinder 4 is therefore more streamlined in shape than the conventional circular cross-sectional shape. The oleo strut 3 has a circular cross-section and is snugly received within an interior surface also having a circular cross-section of the cylinder 4. Providing the strut 3 on top of the cylinder 4 and therefore within the landing gear bay 5 allows other components that would otherwise contribute to unwanted noise production also to be placed within the bay 5. For example, both the torque links 7 and steering actuators 8 are positioned wholly within the landing gear bay 5.

Whilst the present invention has been described and illustrated with reference to particular embodiments, it will be appreciated by those of ordinary skill in the art that the invention lends itself to many different variations not specifically illustrated herein. For that reason, reference should be made to the claims for determining the true scope of the present invention. By way of example, certain variations to the above-described embodiments will now be described. The air exhaust of the second embodiment may include several outlets, the outlets being arranged so that together, during the approach on landing, they produce separate high speed airflows that collectively form an air curtain that acts so as to divert at least partly, air away from noise generating regions of the landing gear.

The invention claimed is:

1. An aircraft landing gear bay at least partly defined by a door, wherein the aircraft landing gear bay comprises
    a landing gear movable between (i) a stowed position, in which the landing gear is wholly contained within the interior space of the landing gear bay behind the door, and (ii) a deployed position, and
    a wheel assembly at the lower end of the landing gear, the landing gear including:
        a load bearing support, the support being connected between the upper end of the landing gear and the wheel assembly, the support including a shock-absorbing piston and barrel arrangement facilitating relative movement, in the vertical direction when the landing gear is deployed, between the wheel assembly and the upper end of the landing gear, and
        a torque link comprising a first link member having first and second ends and a second link member having first and second ends, said first end of said first link member being pivotally attached to the piston, said second end of said first link member being pivotally attached to said first end of said second link member, and said second end of said second link member being pivotally attached to the barrel, such that the torque link prevents axial rotation of the barrel with respect to the piston, said piston having an exposed portion that extends from the first end of the first link to the barrel,
    and wherein,
        noise that might otherwise be produced by the torque link is reduced by means of:
        the load bearing support of the landing gear being so configured that the piston is positioned closer to the upper end of the landing gear than the barrel so that
    at least part of the piston is partly contained within the interior space of the landing gear bay of the aircraft, when the landing gear is in the deployed position, thus the exposed portion of the piston and the torque link are contained within the interior space of the landing gear bay of the aircraft, when the landing gear is in the deployed position.

2. An aircraft landing gear bay according to claim 1, wherein the piston and barrel arrangement is so configured that, when the landing gear is in its deployed position and the piston and barrel are extended to the normal operating maximum extension, the majority of the piston is contained within the interior space of the landing gear bay of the aircraft.

3. An aircraft landing gear bay according to claim 2, wherein substantially the entire torque link is contained within the interior space of the landing gear bay of the aircraft when the landing gear is in the deployed position.

4. An aircraft landing gear bay according to claim 1, wherein the landing gear also includes a steering actuator or other steering mechanism at least partly contained within the interior space of the landing gear bay of the aircraft when the landing gear is in the deployed position.

5. An aircraft landing gear bay according to claim 4, wherein one or both of said steering actuator and other steering mechanism are substantially wholly contained within the interior space of the landing gear bay when the landing gear is in the deployed position and the piston and barrel are extended to the normal operating maximum extension.

6. An aircraft landing gear bay according to claim 1, wherein the landing gear includes a noise reduction fairing that fairs the barrel.

7. An aircraft landing gear bay according to claim 6, wherein the barrel comprises a cylindrical bore having a circular cross-section that accommodates the piston, which is shaped to fit inside the cylindrical bore, and the noise-reduction fairing is arranged to provide the barrel with a streamlined shape.

8. An aircraft landing gear bay according to claim 1, wherein the piston is in the form of an oleo strut and the barrel is in the form of an oleo cylinder, the oleo strut and the oleo cylinder together forming a shock absorber.

9. An aircraft landing gear bay according to claim 8, wherein the torque link is so arranged that, when the landing gear is in the deployed position and the oleo strut and cylinder are extended to the normal operating maximum extension, the position at which said first end of said first link is pivotally attached to the oleo strut is vertically above the position at which said second end of said first link member is pivotally attached to said first end of said second link member, and the position at which said second end of said first link member is pivotally attached to said first end of said second link member is vertically above the position at which said second end of said second link member is pivotally attached to the oleo cylinder.

10. An aircraft landing gear bay according to claim 1, wherein the aircraft landing gear bay is part of a commercial passenger aircraft designed to carry more than 50 passengers.

11. A commercial passenger aircraft designed to carry more than 50 passengers including a landing gear bay according to claim 1.

* * * * *